Figure 1:
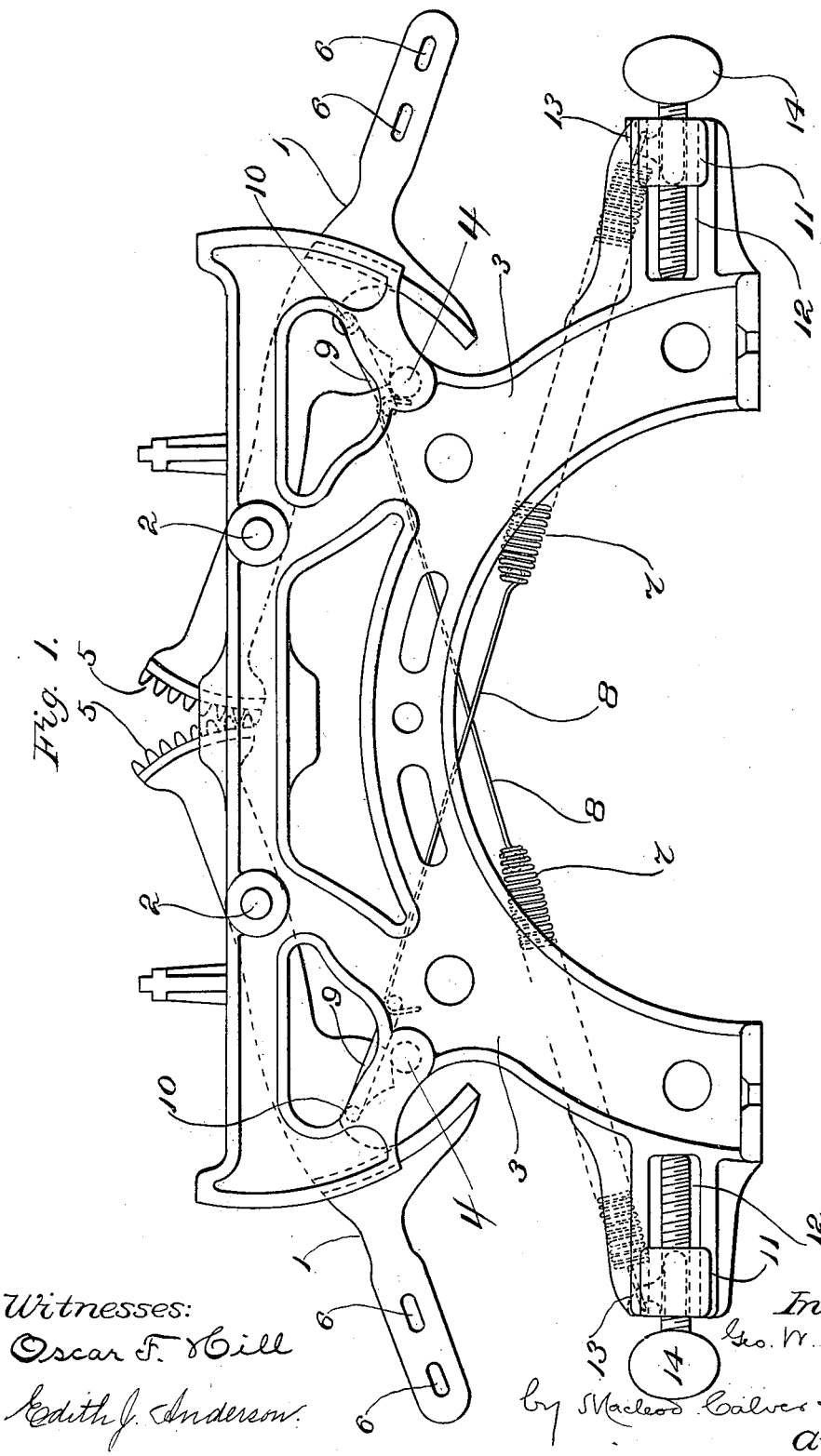

No. 654,077. Patented July 17, 1900.
G. W. STAFFORD.
HARNESS FRAME OPERATING DEVICE FOR LOOMS.
(Application filed June 23, 1898.)
(No Model.) 2 Sheets—Sheet 1.

Witnesses:
Oscar F. Hill
Edith J. Anderson

Inventor:
Geo. W. Stafford
by Macleod Calver Randall
Attorneys.

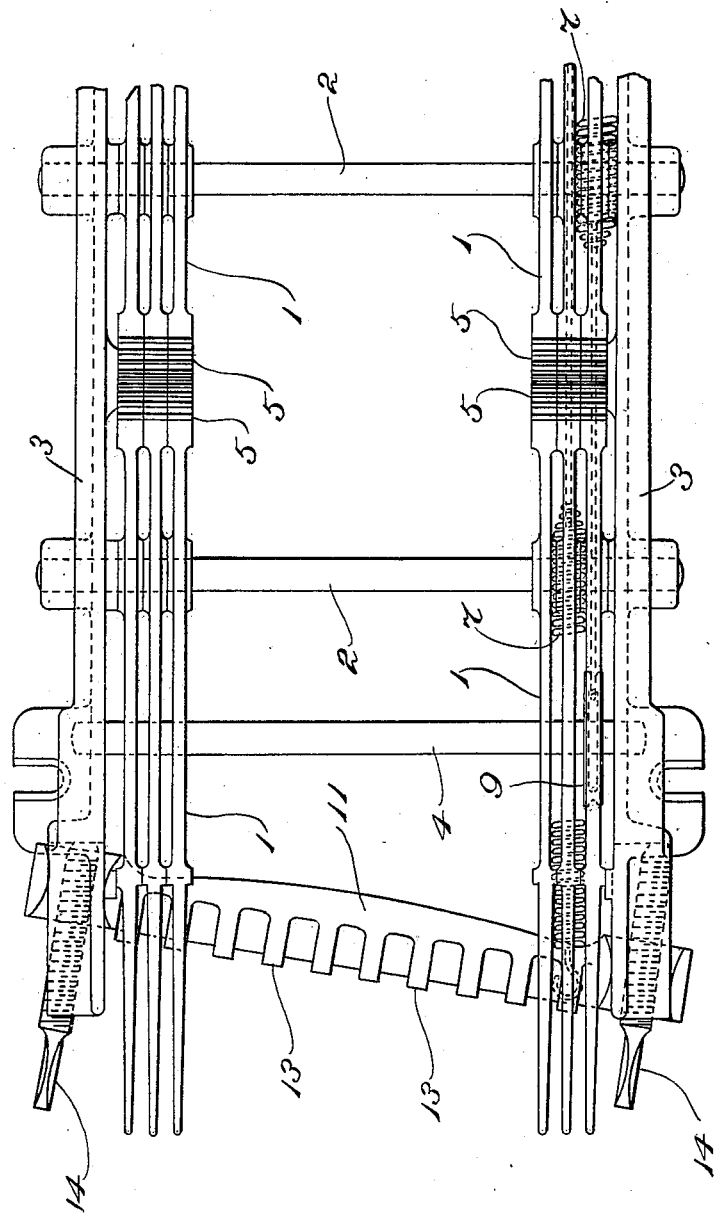

UNITED STATES PATENT OFFICE.

GEORGE W. STAFFORD, OF PROVIDENCE, RHODE ISLAND, ASSIGNOR TO THE CROMPTON & KNOWLES LOOM WORKS, OF WORCESTER, MASSACHUSETTS.

HARNESS-FRAME-OPERATING DEVICE FOR LOOMS.

SPECIFICATION forming part of Letters Patent No. 654,077, dated July 17, 1900.

Application filed June 23, 1898. Serial No. 684,233. (No model.)

*To all whom it may concern:*

Be it known that I, GEORGE W. STAFFORD, a citizen of the United States, residing at Providence, in the county of Providence and State of Rhode Island, have invented certain new and useful Improvements in Harness-Frame-Operating Devices for Looms, of which the following is a specification, reference being had therein to the accompanying drawings.

In certain classes of shedding mechanism for looms the harness-frames are moved positively in one direction to spread or separate the warp-threads in opening the sheds and are moved in the opposite direction through the action of springs to close the sheds. Various combinations and arrangements of devices have been contrived for the purpose of effecting this return movement of the harness-frames. These devices are termed sometimes "spring-jacks." My invention has relation to devices of this class; and it has for its object in general to improve the construction thereof.

One particular object of the invention is to provide means whereby to cause the action of the springs as transmitted to the harness-frames to vary progressively from front to rear in the series of harness-frames which is employed in a loom.

The invention consists in an improved construction and combination of parts, which will be described fully with reference to the accompanying drawings, in which latter is illustrated the best embodiment of the invention that I have yet contrived, after which the distinguishing characteristics of the invention will be particularly pointed out and distinctly defined in the claims at the close of this specification.

Figure 1 of the accompanying drawings is a view in front elevation of a spring-jack embodying the invention. Fig. 2 is a view in plan of the same, one end thereof being broken away.

1 1 are levers mounted to turn freely on rods 2 2, having the ends thereof fixed in the front and rear frames or plates 3 3. 4 4 are other rods applied to the said frames or plates 3 3 and serving to tie them together at the requisite distance apart from each other. The levers 1 1 are arranged in pairs, those of each pair being disposed in line with each other and their proximate ends being operatively connected with each other, so as to cause the pair of levers to move in unison. I have shown the said ends as formed with gear-segments 5 5, the teeth of which intermesh. In Fig. 2 the greater part of the series of levers is omitted for the sake of simplicity. The outer ends of levers 1 1 are provided with holes 6 6 for the reception of connections (not shown) extending to and joined to the harness-frames. (Not shown.)

7 7 are springs, the inner ends of which are connected, as by connections consisting of wires 8 8 and loops 9 9, with hooks 10 10, with which levers 1 1 are formed or provided. These hooks are located on the under edges of the outwardly-extending arms of the levers.

11 11 are girths or bars which are located at the opposite ends of the plates or frames 3 3, the ends of each of the said girths or bars 11 fitting within slots or slideways 12 12, which are provided in the end portions of the said plates or frames 3 3, as shown clearly in Fig. 1. The outer ends of the springs 7 7 are engaged with hooks 13 13 on these girths or bars 11 11. One of the latter may be dispensed with in some cases, if desired, and all of the springs may be connected with a single girth or bar. By preference, however, I employ the two girths or bars 11 11 which are shown and dispose them at opposite ends of the plates or frames 3 3, as in Fig. 1, and I connect a part of the springs with one such girth or bar and the remaining part of the springs with the other girth or bar. The two sets of springs and the corresponding connections 8 8 extend in opposite directions, as shown, the connections 8 8 of the respective sets of springs alternating and crossing one another, as in Fig. 1. The connections of one set of springs are joined by their loops 9 9 to the alternate levers at one end of the plates or frames 3 3, while those of the other set of springs are joined by their loops to the intermediately-disposed levers at the other end of the said plates or frames. Thus each intermeshing pair of levers has connected to one of the component levers thereof one of the springs 7. The employment of two girths or bars 11 11, located at opposite ends of the plates or frames 3 3, and the division of the springs 7 7 into two sets of springs extending in opposite directions, with one set connected to one of the said girths or bars and the other set connected to the other girth or bar, provides against any crowding of the springs together and also against interference with the free working of the same, while it permits springs of the requisite dimensions and strength to be employed. As will be obvious from the drawings, the springs are so arranged and connected that when the harnesses are fully down the springs are capable of exerting the greatest effect upon the levers 1 1 and the harness-frames which are connected therewith and that in proportion as the harness-frames and levers are raised the springs are caused to come more nearly into line with the rods 2 2, on which the levers are mounted, whereby in obvious manner the effect of the springs upon the levers and harness-frames is lessened.

I have ascertained in practice that in looms employing a considerable number of harness-frames, (for instance, twenty, twenty-four, or twenty-six,) and particularly where more warp-threads are drawn into the front harness-frames than into those at the rear, improved results are attained by varying the tension of the depressing-springs of the successive harness-frames progressively from one side of the series of harness-frames to the other side thereof. This progressive difference of tension compensates for the fact that the rear harness-frames progressively have to be raised higher than the front ones in order to produce a uniform shed and that hence more resistance has to be overcome in actuating the rear harness-frames. It compensates also for the increased tendency on the part of the front harness-frames, with their proportionately-greater number of warp-threads, to lift adjoining harness-frames in consequence of the friction of the warp-threads on one another. The greater the number of warp-threads that is drawn into a given harness-frame the greater is the tendency, when such harness-frame is raised, for its warp-threads, by engagement with adjoining warp-threads, to raise one or more of the other harness-frames sufficiently to disturb the level or uniformity of the lower plane of the shed. In accordance with my present invention I give an inclined position to the girths or bars 11 11, causing them to stand farther apart at their front ends than at their rear ends, as indicated in Fig. 2. Capacity for adjustment is found important in practice, and hence I apply to the opposite ends of each girth or bar 11 the adjusting or set screws 14 14, by means of which the position of the respective girths or bars may be raised as required and whereby the tension of the springs 7 7 may be adjusted. In consequence of employing a separate screw at each end of each girth or bar the inclination or angularity of the latter may be varied to any required extent as may be desirable in varying the relative tension of the respective springs. Thereby the difference of tension from front to rear in the set of springs may be made as great as desired and the girths or bars even may be so positioned as to secure uniformity of tension if that be wished.

I claim as my invention—

1. The spring-jack comprising levers for connection with the harness-frames of a loom, springs operatively connected with the said levers, and an inclined or obliquely-disposed support for the said springs, substantially as described.

2. The spring-jack comprising levers for connection with the harness-frames of a loom, springs operatively connected with the said levers, a girth with which said springs are connected, and means to adjust the said girth into the desired inclined or oblique position, substantially as described.

3. The spring-jack comprising levers operatively connected together in pairs at their meeting ends, oppositely-located inclined or obliquely-disposed girths or bars, two sets of springs respectively applied to the respective girths or bars, and connections, as 8, 8, extending alternately in opposite directions from the respective sets of springs to levers at the opposite ends of the spring-jack, substantially as described.

4. The spring-jack comprising levers operatively connected together in pairs at their meeting ends, oppositely-located angularly-disposed girths or bars, means to adjust the position or angle of the said girths or bars, two sets of springs respectively applied to the respective girths or bars, and connections, as 8, 8, extending alternately in opposite directions from the respective sets of springs to levers at the opposite end of the spring-jack, substantially as described.

In testimony whereof I affix my signature in presence of two witnesses.

GEORGE W. STAFFORD.

Witnesses:
EMMA NISBET,
WILLIAM G. ANTHONY.